Oct. 2, 1923.

W. F. HERZBERG 1,469,415

PHOTOGRAPHIC DEVELOPMENT GAUGE

Filed Feb. 10, 1921

WITNESS:
Raymond L Greist

INVENTOR
WALTER F. HERZBERG
BY Cromwell, Greist & Warden
ATT'YS.

Patented Oct. 2, 1923.

1,469,415

UNITED STATES PATENT OFFICE.

WALTER F. HERZBERG, OF CHICAGO, ILLINOIS.

PHOTOGRAPHIC DEVELOPMENT GAUGE.

Application filed February 10, 1921. Serial No. 443,757.

*To all whom it may concern:*

Be it known that I, WALTER F. HERZBERG, a citizen of the United States, residing at Chicago, in the county of Cook and State of Illinois, have invented certain new and useful Improvements in Photographic Development Gauges, of which the following is a specification.

This invention relates in general to the art of photography, and contemplates specifically the provision of a novel development gauge for indicating, throughout the development of an exposed photographically sensitized medium, the degree or stage of development which the medium has reached.

When such a sensitized medium, in order to bring out a latent image formed thereon by exposure, is developed by any of the methods heretofore ordinarily employed, it is oftentimes extremely difficult to determine either from the appearance of the image as it progressively becomes more perceptible on the medium, or from any predetermined time-of-immersion indicant, whether said medium has reached the proper degree of development, is still underdeveloped or is overdeveloped. Although this difficulty is probably met with most commonly by amateur photographers when developing their own films, it is nevertheless true that a large proportion of the photographic plates and films which are placed in the hands of commercial photographers for development, and which, when developed, result in poor negatives, apparently due to improper exposure, are in fact ruined on the contrary by improper development.

As is known in the art, a plate or film should be normally developed, regardless of whether the same has been under, normally or overexposed. Intensifiers, reducers and such other means as are usually employed to bring out contrast and detail on under or overexposed negatives, will give best results when the plate or film in question has received normal development.

The necessity of having some positive and accurate means for indicating when the medium which is undergoing development has reached normal development is therefore obviously of prime importance when good results are to be obtained. Predetermined time-of-immersion indicants and the like are inaccurate both because of the lack of uniformity in strength, age and composition of the emulsions forming the surfaces of the mediums, and because of the temperature and progressively decreasing strength of the developer.

The main and primary object, therefore, of the present invention is to provide a gauge on or associated with a photographically sensitized medium for indicating the stages in the development thereof.

Another important object is to provide a gauge of the character described for indicating when such a surface has reached normal development.

Still another important object is to provide such a gauge which will remain on the medium developed and serve as an inconspicuous but permanent and indisputable record as to whether or not that particular medium received proper development.

Further objects of the invention are the provision of a gauge of this kind which is part of the sensitized medium and serves as an accurate indicator of the development of the same; and which is preferably formed in the marginal unused portions of such surfaces and therefore requires no additional material for its inclusion, whereby a purely nominal production cost for the gauge per se results.

Other objects and advantages of the invention will become apparent as the nature of the same is better understood from the following detailed description predicated upon the accompanying drawing.

One embodiment of the invention is hereinafter presented for the purpose of exemplification, but, since this invention is obviously capable of employment in other and diversified forms, it should be understood that the particular embodiment here disclosed is not intended to restrict the spirit of the invention or to limit unnecessarily the scope of the appended claims.

In the drawings,

Fig. 1 illustrates the appearance of the medium and gauge prior to development;

Fig. 2 illustrates the same when at that incomplete state of development commonly referred to as "under-developed";

Fig. 3 illustrates the same upon reaching the correct stage of development, wherein the medium is said to be "normally developed"; and Fig. 4 illustrates the same upon subjection to the developing agent for too long a period of time, resulting disastrously in an "over-developed" medium.

Figure 4:
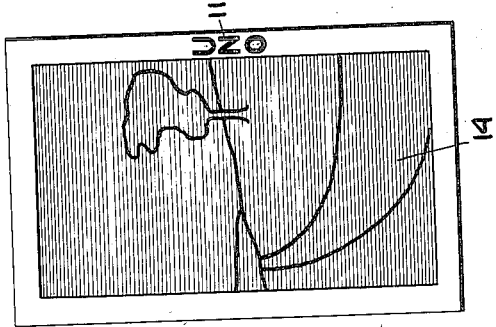
Figs. 1, 2, 3 and 4 are all views of the same photographically sensitized medium as it would appear at different stages of its development after normal exposure; the gauge of this invention being shown as disposed in the right hand marginal portion of the medium.

Referring now in detail to the drawing, the numeral 10 indicates a normally-exposed, but as yet undeveloped, photographically sensitized medium provided with a development gauge designated generally by the numeral 11.

Figure 3:
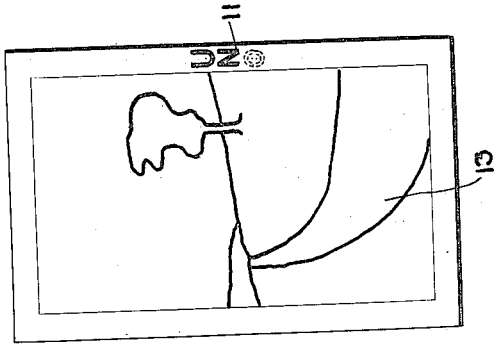
Figure 2:
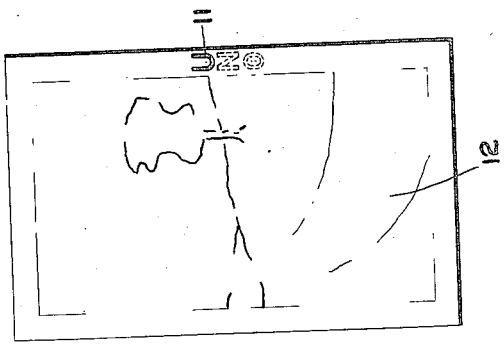
Figure 1:
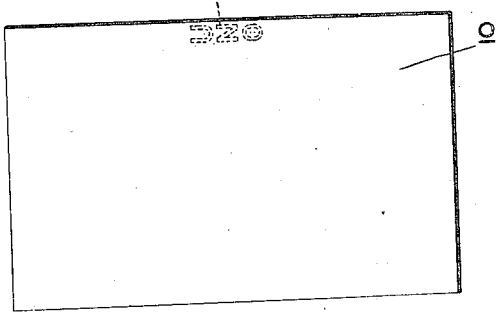

In the particular embodiment of the invention here used for exemplification this indicating gauge 11 is disclosed as a series of three latent index letters, "U", "N" and "O", each of which, in the order named, develops into a visible letter upon the marginal portion of the sensitized medium when the same is undergoing development. The letters above mentioned stand respectively for the words "under-developed", "normally-developed", and "over-developed", and are so formed in the sensitized medium that the letter "U" alone will appear fully when the medium is partially but not yet sufficiently developed, as shown in Fig. 2; the letter "N" will appear fully adjacent the letter "U" when the medium is normally developed, as shown in Fig. 3; and the letter "O" will appear adjacent the two already visible letters if the medium is developed too much, as shown in Fig. 4.

In the development of the medium, the appearance first of only the letter "U", indicates to the operator that that particular medium is not as yet fully developed, and that the same should therefore be allowed to remain longer in the developing solution.

Upon continuing the development the letter "N" will also appear, signifying conclusively that the medium is now properly or normally developed and should be removed from further action of the developing agent.

If the development be now continued after the letter "N" has appeared, the letter "O" will also appear to indicate that the development has been carried too far.

In Figs. 2, 3 and 4, the formerly latent image of the object or scene exposed upon the medium is shown at 12 as faint, at 13, as normal, and at 14 as fogged from over-development.

The index letters are so formed on the medium 10 that the unaccompanied appearance of the letter "U" in development indicates the same degree below normal development that the appearance of the letter "O" indicates beyond normal development.

The gauge may be formed on the unexposed and undeveloped sensitized medium by any suitable accurate means such as separate exposures of the medium within the contour of each index character to light of carefully varied intensity or of the same intensity for varied periods of time, by treatment of the medium within said contours with chemicals which will give the same result thereon as the exposure to light, or by a combined treatment of light and chemicals.

When light exposure, for instance, is used, the area of the letter "U" should be over-exposed in order, of course, to appear first upon development, the letter "N" should be carefully exposed a normal amount for that particular medium, and the letter "O" should be proportionately under-exposed in order that it will not become visible except upon over-development.

This gauge is not only of great value as a means for guiding one in the development of plates and films, but also serves as a reliable, indisputable and permanent check or record on each negative as to whether or not the same was given proper care in its development by others. For instance, if a plate or film equipped with the gauge of this invention is developed by one commercially doing that kind of work and a poor negative results, the customer cannot contend, as often is the case, that the film was either under or over-developed if the gauge indicates conclusively on the film itself that the same was normally developed; whereas, if the film was really under or over-developed the gauge gives absolute evidence of the fact and is therefore an accurate check on the work done.

It will be appreciated from the nature of this invention that it is immaterial what symbols are employed as indexes or where the same are located on the sensitized medium, the particular symbols and their location as set forth in this disclosure being chosen solely for the purpose of exemplification.

I claim:

1. A gauge for indicating the degree of development attained by a photographically sensitized medium, comprising a series of latent indexes which become visible consecutively upon continued development.

2. A gauge for indicating the degree of development attained by a photographically sensitized medium, comprising a series of latent indexes which are formed on said medium and become visible consecutively upon continued development.

3. A gauge for indicating the degree of development attained by a photographically sensitized medium, including a latent index which becomes visible when said medium reaches the normal degree of development therefor.

4. A gauge for indicating the degree of development attained by a photographically sensitized medium, including a latent index which becomes visible when said medium is partially and still underdeveloped.

5. A gauge for indicating the degree of development attained by a photographically sensitized medium, including a latent index which becomes visible when said medium has received more than the normal degree of development therefor.

6. A gauge for indicating the degree of development attained by a photographically sensitized medium, comprising a series of latent indexes which become permanently visible consecutively upon continued development.

7. A gauge for indicating the degree of development attained by a photographically sensitized medium, comprising a latent index which becomes visible when said medium is partially and still underdeveloped, a latent index which becomes visible when said medium reaches the normal degree of development therefor, and a latent index which becomes visible when said medium has received more than the normal degree of development therefor.

8. A gauge for indicating the degree of development attained by a photographically sensitized medium, comprising a latent index which becomes permanently visible when said medium is partially and still underdeveloped, a latent index which becomes permanently visible when said medium reaches the normal degree of development therefor, and a latent index which becomes permanently visible when said medium has received more than the normal degree of development therefor.

9. A gauge for indicating the degree of development attained by a photographically sensitized medium, comprising a series of latent indexes which are formed on said medium in a marginal unused portion thereof and become visible consecutively upon continued development.

In testimony whereof I have hereunto subscribed my name in the presence of two subscribing witnesses.

WALTER F. HERZBERG.

Witnesses:
  LEWIS T. GREIST,
  RAYMOND L. GREIST.